March 8, 1966  R. E. HOFFMAN  3,238,563
DECKLES FOR PLASTIC EXTRUSION MACHINES
Filed Dec. 31, 1962  2 Sheets-Sheet 1
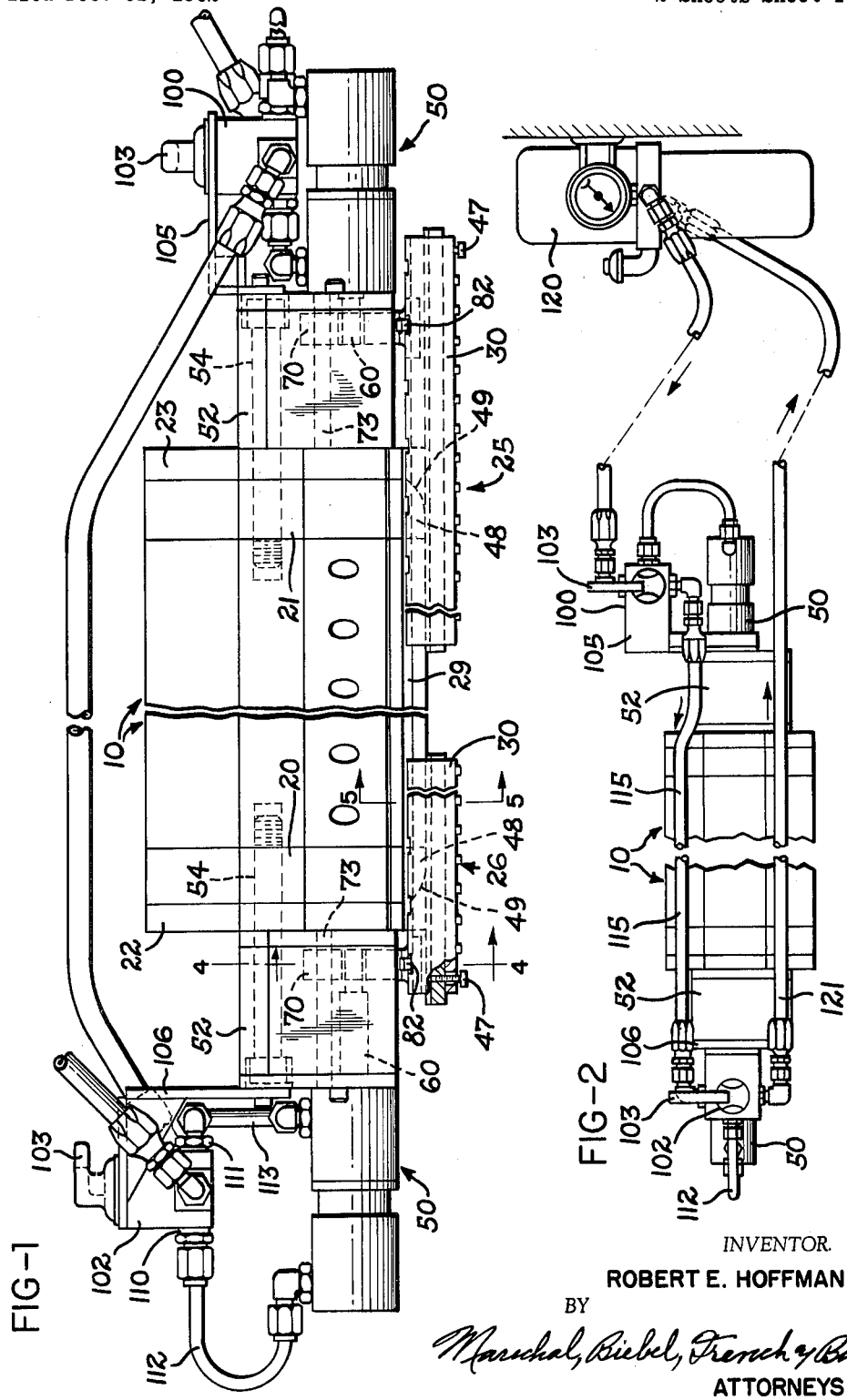
INVENTOR.
ROBERT E. HOFFMAN
BY
Marechal, Biebel, French & Bugg
ATTORNEYS March 8, 1966  R. E. HOFFMAN  3,238,563
DECKLES FOR PLASTIC EXTRUSION MACHINES
Filed Dec. 31, 1962  2 Sheets-Sheet 2
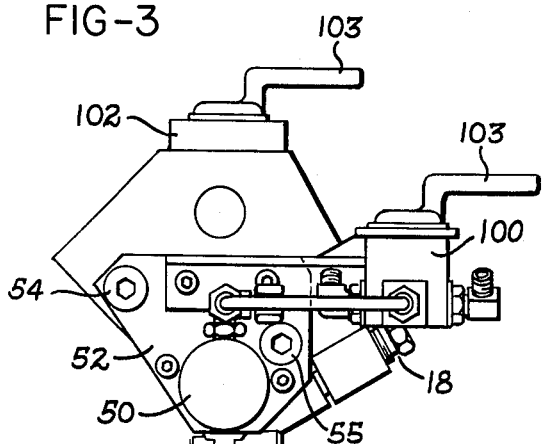
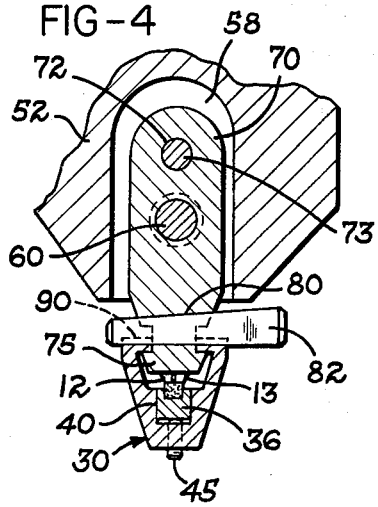
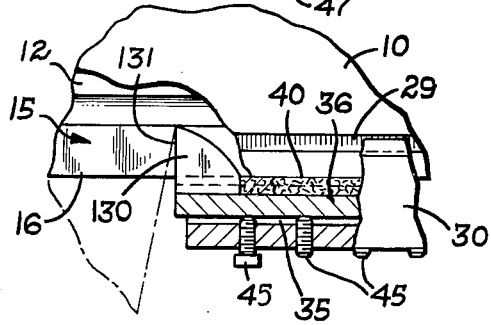
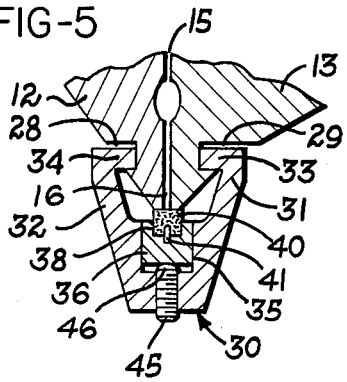
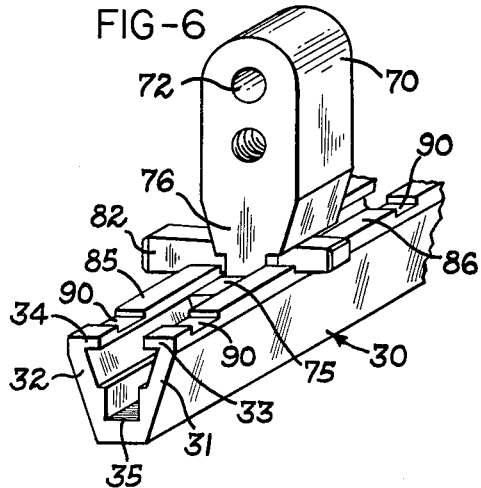
INVENTOR.
ROBERT E. HOFFMAN
BY
Marechal, Biebel, French & Bugg
ATTORNEYS

United States Patent Office 3,238,563
Patented Mar. 8, 1966

3,238,563
DECKLES FOR PLASTIC EXTRUSION MACHINES
Robert E. Hoffman, Akron, Ohio, assignor to The Black-Clawson Company, Hamilton, Ohio, a corporation of Ohio
Filed Dec. 31, 1962, Ser. No. 248,322
10 Claims. (Cl. 18—12)

This invention pertains to plastic extruders and more particularly to a powered deckle for controlling the width of extrusion from a flat film die.

The invention has particular applicability for use on extrusion coating apparatus for adjusting the extrusion width where a plastic film is applied to a substrate, such as a paper web. With the advent of extrusion coating, it became apparent that it would be uneconomical to provide a different die for each width of substrate. Also, in extruding hot plastic film, the width of extrusion down-stream from the die is narrower than the die orifice, and the film is said to "neck in." The neck-in differs with different pressures and outputs of the plastic extrusion die. It also became necessary to provide some means for following the web when applying the plastic as a coating, since the web may run off center. Accordingly, some arrangement became necessary to adjust the width of the extruded film directly on the die.

One arrangement which has become accepted practice in the industry is the use of a die having a width equal to the roll face of the machine, and end blocks to limit the die extruding width to that required coat a particular substrate. This arrangement required long periods of machine set-up time. Since the neck-in cannot be predicted accurately beforehand, it is often necessary to place the extrusion apparatus into actual operation in order to determine the width of extrusion desired, resulting in waste and time loss.

As a result of these requirements, the deckle rod was devised, and both internal and external deckle rods have been used. An example of one suitable internal deckle rod is shown and described in the copending application of Allenbaugh et al., Serial No. 127,051, filed July 26, 1961, now Patent No. 3,132,377, and assigned to the same assignee as this invention. Also, external deckles have been applied, and the preferred embodiment of this invention is described in terms of an external deckle rod, although the teachings thereof may be applied to internal deckling as well. The deckle rod described in this preferred embodiment is particularly advantageous since it does not leak, does not expose the hot plastic within the die lips or orifice to air thereby eliminating carbon build up on the die lips, and does not interfere with the uniform flow of the melt.

This invention provides an extruder die wherein the width of extrusion may be varied and controlled while the die is at operating temperature and extruding. For this purpose, the invention includes servo means having a direct connection to a deckle rod for moving the deckle rod relative to the die body during the operation of the extruder. The servo means preferably consists of a two way hydraulic cylinder motor mounted on a suitable support or block at each end of the die and operated by a hydraulic control system. The hydraulic motor is connected to operate the adjacent deckle rod by a releasable connection providing an arrangement whereby the hydraulic motors, having a relatively short stroke, can move their respective deckle rods over a wide range of adjustments. The deckle rod of this invention is particularly adapted to be adjusted during extruder operation "on the fly" without leaking.

It is therefore an important object of this invention to provide a film extruding die having an automatic powered deckle for film width adjustment.

Another important object of this invention is the provision of a flat film die which may be adjusted as to width of extrusion during the operation of the die to compensate for the width of the substrate and the degree of neck-in.

A further object of this invention is the provision of a hydraulically operated deckle rod.

Another object of this invention is the provision of an external deckle arrangement for a flat film die and apparatus for adjusting the relative effective position of the external deckle relative to the extrusion orifice while the die is in operation at extruding temperature, pressure and rate.

An important feature of this invention resides in its ease of operation and in the fact that the extrusion width of the flat film die may be controlled individually at either end of the die merely by the turning of a hydraulic control lever, independently of the other end of the die.

A further object of this invention is the provision of apparatus by which the edge thickness of the extruded sheet may be controlled.

These and other objects and advantages of the invention will be apparent from the following description, the accompanying drawings and the appended claims.

In the drawings—

FIG. 1 is a partially broken away front elevational view of a flat film extrusion die and deckle arrangement constructed according to this invention;

FIG. 2 is a plan view of the die arrangement of FIG. 1, reduced in size, and illustrating the connections to the hydraulic pressure source;

FIG. 3 is a right end view of the die arrangement of FIG. 1;

FIG. 4 is an enlarged partial transverse section showing the connection of the deckle foot of the hydraulic piston motor with the deckle rod, taken generally along the line 4—4 of FIG. 1;

FIG. 5 is an enlarged fragmentary transverse section through the die lips and the deckle rod, taken generally along the line 5—5 of FIG. 1;

FIG. 6 is a fragmentary isometric view showing the connection of the deckle foot with the deckle rod; and FIG. 7 is a partially broken away front elevational view of the right hand deckle rod showing an arrangement by which the thickness of the edge of the film may be controlled.

Referring to the figures of the drawings, which illustrate a preferred embodiment of the invention, a flat film extruding die body is shown generally at 10 in FIGS. 1 and 2. The die body 10 is shown in these figures as having the center portion thereof broken away, and with the die body heating means removed for clarity of illustration. The die body 10 is preferably constructed according to the teachings of the copending application of Hoffman et al., Serial No. 126,994, filed July 26, 1961, now Patent No. 3,142,090, and assigned to the same assignee as this application. Accordingly, the body 10 is preferably formed as a unitary piece of metal within which is formed an extrusion cavity or manifold, although the invention may be applied to split dies or to other types of film extruding dies.

The died body 10 includes a pair of tapered, relatively adjustable die lips, as shown in FIG. 5, including a fixed die lip 12 set into the body extrusion cavity, and a relatively movable or adjustable die lip 13. The die lips 12 and 13 define a longitudinally extending extrusion passageway 15 terminating in an extrusion orifice 16. The gage thickness of the extruded film may be controlled by differential screw adjusters 18, FIG. 3, such as described in the said application of Hoffman et al., above.

The die body 10 is preferably heated to the desired extrusion temperature by induction heaters, as fully described and claimed in the copending application of Schroyer et al., Serial No. 127,052, filed July 26, 1961, now Patent No. 3,179,778, and assigned to the same assignee as this invention. As shown in FIGS. 1 and 2, the die body 10 is provided with opposite end caps 20 and 21 which form closure plates for the internal manifold or cavity, and associated pads of insulation 22 and 23 at the outer surfaces of the respective end caps.

Means at each end of the die body 10 for limiting the width of extrusion through the orifice 16 includes right and left deckle rod assemblies 25 and 26 (FIG. 1). The right and left deckle rod assemblies are preferably identical in construction to each other, and accordingly, are interchangeable. Each of the assemblies 25 and 26 is proportioned to extend beyond the end caps of the die, as shown in FIG. 1, and is slidably mounted on the die.

Details of one of the deckle rod assemblies may be had by referring to FIGS. 3-6 wherein it is seen that the die lips 12 and 13 are provided with means defining a deckle track, consisting in part of a generally U-shaped longitudinally extending groove 28 formed in the outer surface of the fixed die lip 12 adjacent the lower terminal end thereof. A cooperating longitudinal groove 29 is formed in the adjustable die lip 13 opposite the groove 28. The grooves 28 and 29 form a longitudinally extending track in the die providing for adjustable movement of the deckle rod assemblies for varying the width of extrusion.

The assemblies 25 and 26 include a longitudinally extending deckle carrier, which is known as a deckle "boat," indicated generally at 30. The deckle boat 30 is preferably formed from a single piece of metal and includes upwardly extending opposite arms 31 and 32 which terminate in inwardly turned ends 33 and 34 slidably received within the track defined by the slots 29 and 28. The boat 30 is formed with a U-shaped recess 35 extending in the bottom thereof opposite the extrusion orifice 16.

A deckle bar 36 is proportioned to be received within the recess 35 for limited reciprocal movement therein in relation to the orifice 16. The bar 36 is formed with a U-shaped groove 38 to receive a strip of packing 40 and to support the packing tightly against the outer surface of the die lips 12 and 13 at the orifice 16. A plurality of spaced apart pins 41 are preferably set into the bar 36 at the groove 38 to engage the packing 40 and prevent slipping of the packing within the bar 36. The packing 40 is preferably formed of asbestos impregnated with graphite or polytetrafluoroethylene to provide both packing and lubricating qualities.

Means for regulating and controlling the pressure or sealing force of the packing 40 against the die lips 12 and 13 at the orifice 16 includes a plurality of set screws 45 which are threadedly extended through the bottom of the boat 30. The screws 45 have smoothly rounded upper ends 46 movable into engagement with the bottom of the deckle bar 36.

The outside end of the boat 30 of each of the assemblies 25 and 26 is bored to accept a shouldered keeper bolt 47 (FIGS. 1 and 7). The bolt 47 has an inner end threaded into the bar 36 and serves to restrain the ends of the bars from tipping upwardly within the boat 30 which might otherwise occur due to the fact that generally only the inner portion of the packing 40 and the bars 36 is in pressure contact with the die lips 12 and 13. Also, as shown in FIG. 1, the end caps 20 and 21 are provided with end blocks 48 which are coterminous with the die lips and which have the same outer configuration as the die lips, including the grooves 28 and 29, but without the extrusion orifice, thereby forming the terminal ends of the extruding orifice. The blocks 48 have tapered lower surfaces or edges 49 which present a smoothly rounded surface leading to the extrusion orifice 16 to facilitate the sliding movement of the packing 40 on the die lips.

The external deckle provided by the bar 36 and the packing 40 is effective to prevent extrusion through the orifice 16 over the linear extent of the packing. The set screws 45 are preferably tightened against the bar 36 only to the extent necessary to assure a seal at the die lips, and experience has shown that the set screws 45 need only be tightened hand tight. The deckle of this invention effects a seal at the extremity of the die lips, as distinguished from deckles which effect the seal within the die lips. Therefore, this deckle does not expose hot plastic in the die lips to the surrounding air, and thus prevents carbon build up on the die lips which would interfere with uniform melt flow. If the deckle assemblies 25 and 26 are retracted to expose a greater linear portion of the orifice, a uniform flow through the orifice results without interference from carbon build up within the passageway 15 or the orifice 16. Therefore, the plastic material within the passageway 15 which is blocked by the operation of the deckle rod assemblies, is in a liquid state fully ready for extrusion through the orifice when the assemblies are retracted.

Powered deckle servo means for positioning the deckle rod assemblies 25 and 26 according to the desired width of extrusion includes a two-way hydraulic piston motor 50 mounted on each end of the die body 10. The piston motors 50 and their associated controls are essentially identical, and each is mounted on the adjacent end caps 21 or 22 on a piston mounting block 52. The blocks 52 are secured by tie bolts 54 and 55 (FIG. 3) which extend through the blocks 52 and through the adjacent end caps and insulation blocks directly into the die body 10. The mounting blocks are partially hollow and define a downwardly opening cavity 58. The hydraulic piston motors 50 include an extensible piston rod 60 arranged for longitudinal movement with respect to the die extruding orifice within the cavity 58.

Temporary coupling means connecting each of the piston rods 60 to the adjacent deckle rod assembly includes a deckle foot 70 which is threadedly mounted on the end of the rod 60 for movement therewith within the cavity 58. The upper end of the foot 70 is bored as indicated at 72 in FIG. 6 for sliding guided movement on a pilot bolt 73 which bolt extends the length of the cavity 58 within the block 52.

The lower end of the deckle foot 70 is provided with a shoe 75 which is proportioned to be received wholly within the boat 30 between the arms 31 and 32 above the packing 40 (FIG. 4). The shoe 75 is joined with the deckle foot 70 by a reduced neck portion 76 which is proportioned to extend between the inwardly turned ends 33 and 34 of the arms 31 and 36. The shoe 75 has a length which is greater than the depth of the foot to provide an adequate contact area with the inside surfaces of the boat arms.

The deckle foot 70 at the neck 76 is provided with a tapered slot 80, as shown in FIG. 4, to receive a tapered key 82. The tapered slot 80 is proportioned to extend a distance above the upper edge of the boat 30 downwardly into the shoe 75 slightly below the upper edge of the boat. The upper or exposed surfaces 85 and 86 in the deckle boat arms 31 and 32 are formed with transverse slots as indicated at 90 in FIG. 6. The slots 90 are wide enough to accept and engage the lower edge of the key 82 with the key inserted in the foot 70. The slots 90 provide means on the deckle rod assemblies defining a plurality of spaced connections, with the space between adjacent slots 90 being less than the stroke of the rod 60. For instance, the space between the slots 90 may be two inches while the stroke of the motor 50 may be three inches.

When the key 82 is inserted within the slot 80 it engages the deckle boat 30 at one pair of the transverse slots 90 and effects engagement of the inside surfaces of the ends 33 and 34 by the upper surface of the shoe 75. The key 82 thus provides a releasable thrust connection between the hydraulic motor 50 and the deckle assemblies 25 and 26, providing for movement of the respective assemblies on the die body 10 under control of the motors 50. A wide range of adjustments is provided by the plurality of pairs of slots 90 permitting the deckle assemblies to be inserted or retracted over as wide an extrusion width as desired, in increments of movement. Normally, for fine adjustments, it is not necessary to reposition the foot 70 with respect to the boat 30 since the stroke of the hydraulic motors 50 usually provide sufficient adjustment of the width of extrusion to compensate for the normally encountered variations during operation.

Control means for the motors 50 include a pair of four-way open-center valves 100 and 102.

The open-center four-way valve is constructed in such a manner that, with the control handle 103 in the center position, hydraulic fluid may flow freely through the valve's center parts. With the handle 103 moved to either of the opposite extreme positions, the hydraulic fluid is ported to one end of the motor 50, and the other end is vented to the exhaust port of the valve.

The valves 100 and 102 are mounted respectively on mounting plates 105 and 106 to the blocks 52 at each end of the extrusion die but may be remotely mounted if more convenient. Using the valve 102 as an example, in FIG. 1, it will be seen that the opposite selectable ports 110 and 111 are connected to the opposite ends of the motor 50 through suitable conduits 112 and 113. The open center inlet and outlet ports of the valves 100 and 102 are connected in series by a common connecting pipe 115 to a source of hydraulic pressure which may conveniently consist of a combined pump and tank unit 120. With the valves in their center position, as shown in FIG. 2, the hydraulic fluid from the unit 120 freely flow through the valve 100 and through the valve 102, through line 121 back to the tank. The movement of either of the associated control handles 103 is effective to cause extension or retraction of the piston rod 60 thereby effecting sliding movement of the associated deckle assembly 25 or 26 on the grooves 28 and 29 of the die lips.

The assemblies 25 and 26 may be positioned initially prior to the starting of the extruder to an approximate position. Once the extruder has been brought to operating temperature, and the screw started, the assemblies 25 and 26 may be adjusted during operation to provide fine control of the width of extrusion through the orifice 16. Adjustments of greater width is readily accomplished by the removal of the key 82, and the repositioning of the foot 70 and rod 60 on the guide 73 into alignment with the next adjacent pairs of the slots 90. The key may then be re-inserted for another movement of the associated deckle assembly.

The packing 40 is an expendable item and is readily replaced, when the machine is shut down, by loosening the set screws 45 and by removing the shoulder bolts 48. The bar 36 may then be removed by sliding without disturbing the boat 30, and the packing removed and new packing inserted. With the new packing in place, the set screws 45 may be retightened with the assurance that the width of extrusion has not been materially changed by the changing of the packing.

FIG. 7 illustrates a modification which may be made to the deckle bar 36 to eliminate the thickening of the edge of the plastic sheet which often occurs by reason of the edge of the sheet being fed by the portion of the extruding passageway 15 immediately inwardly of the terminal end of the deckle rods. According to this modification, a flag 130 of thin metallic material may be carried on the end of the bar 36 extending through a suitable slit formed in the packing 40 and proportioned to extend upwardly through the extrusion orifice into the extrusion passageway 15 defined by the die lips 12 and 13. The purpose of the flag 130 is to prevent the supplementing flow of plastic material into the edge of the plastic sheet being extruded, thereby eliminating the usual bead at the edge and resulting in a sheet of uniform thickness. The flag 130 may be made of a single sheet of metal proportioned to lie within the passageway 15, but is preferably formed of two thin sheets of material forming a closure or a fold at the forward edge 131 so that the sheets are like leaves which open under the extruding pressure and conform generally to the adjacent surfaces of the die lips 12 and 13 defining the passageway 15, thereby providing an effective seal preventing the inflow of additional plastic material to the edge defined by the terminal end of the packing 40 on the rod 36.

It can therefore be seen that this invention provides a powered deckle which operates to adjust the extruding width of an extended film extruding die "on the fly" during the normal operation of the machine. Variations in the width of the substrate or its position on the roll, and the degree of neck-in, can be immediately compensated for without the necessity of shutting down the extruding machine to make a manual adjustment, which must be followed by restarting to see whether the adjustment is correct. Although the invention may be applied to internal deckles, the combination with the external deckle is particularly advantageous in that the extruding orifice is externally blocked thus excluding all air which would tend to carbonize the blocked material.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A film extruding die, comprising a longitudinally extending die body having a pair of die lips defining a film extruding orifice, a deckle rod assembly including a bar carrier slidably mounted externally on said die lips proportioned to extend beyond the end of said die body, a deckle bar in said carrier, a packing on said bar held against said die lips by said carrier effective to block an adjustable terminal portion of said orifice for defining the width of extrusion, servo means for effecting said sliding movement of said deckle rod assembly relative to said orifice including a hydraulic piston motor supported on said body with an extensible piston rod, means on said deckle carrier defining a plurality of spaced apart connection with the space between adjacent connections being less than the stroke of said piston rod, and releasable coupling means temporarily connecting said piston rod to said deckle rod assembly at one of said connections.

2. A deckle rod assembly for a flat film die including a die body and a pair of longitudinal extending die lips defining an extruding orifice, comprising a longitudinally extending deckle carrier means slidably mounting said carrier on said die lips, a longitudinally extending bar carried in said carrier externally of said orifice having packing means therein positioned against said die lips at said orifice for sealing said orifice, and a flag formed of thin metal mounted adjacent an end of said bar and proportioned to extend into the die orifice between said lips to restrict inflow of plastic material from the sealed portion of said orifice providing an extruded film having controlled edge thickness.

3. A deckle rod assembly for a flat film die including a die body and a pair of longitudinally extending die lips defining an extruding orifice, comprising a longitudinally extending deckle carrier, means slidably mounting said carrier on said die lips, a longitudinally extending bar carried in said carrier externally of said orifice having packing means thereon positioned against said die lips at said orifice for sealing said orifice and limiting the film width of extrusion therefrom, and a flag formed of a folded leaf of thin metal on said bar and proportioned to extend into the die orifice between said lips with the fold thereof positioned inwardly of said die to restrict inflow of plastic material from the blocked portion of said orifice into the extruded film providing an extruded film having controlled edge thickness.

4. A deckle rod assembly for a flat film die including a die body having a pair of longitudinally extending die lips defining an extruding orifice therebetween, comprising a longitudinally extending deckle carrier having a body and a pair of upwardly extending arms leading from said body and terminating in inwardly extending ends, means on said die lips defining a track receiving said ends and mounting said carrier for sliding movement thereon, a longitudinally extending bar carried in said carrier between said arms, replaceable packing means carried on said bar and positioned against said die lips at said orifice for externally sealing said orifice, means on said carrier body urging said bar and said packing means against said die lips, and controllable motor means on said body having a connection to said carrier and operable to effect said sliding movement therof on said track for regulating the width of extrusion from said die.

5. The film die of claim 4 wherein said packing means consists of a strip of asbestos impregnated with graphite for facilitating the sliding movement thereof at said orifice.

6. The film die of claim 4 wherein said packing means consists of a strip of asbestos impregnated with polytetrafluoroethylene for facilitating the sliding movement thereof at said orifice.

7. A deckle rod assembly for a flat film die including a die body having a pair of longitudinally extending die lips defining an extruding orifice therebetween, comprising a longitudinally extending deckle carrier having a body and a pair of upwardly extending arms leading from said body and terminating inwardly extending ends, means on said die lips defining a track receiving said ends mounting said carrier for sliding movement thereon, a longitudinally extending bar carried in said carrier between said arms, packing means carried on said bar and positioned against said die lips at said orifice for externally sealing said orifice, a plurality of adjustable means in said carrier body urging said bar and said packing means against said die lips, a hydraulic piston motor on said body having a piston rod, a foot on said piston rod having a shoe portion received in said boat between said arms, and releasable coupling means connecting said piston rod at said shoe portion with said carrier and operable to effect said sliding movement of said carrier on said track for regulating the width of extrusion from said die.

8. A powered adjustable deckle for a plastic film extruder die body having means defining a longitudinally extending film extruding orifice, comprising a deckle carrier, means slidably mounting said carrier on said die body, a deckle bar received in said carrier exteriorly of said orifice positioned against said die lips for sealing said orifice, and a flag formed of thin metal mounted at an end of said bar and proportioned to extend inwardly into said die orifice to restrict the flow of plastic material from the sealed portion of the orifice into the film being extruded resulting in an extruded film free of bead at the edge, and motor means mounted on said die body having an operable connection to said carrier for effecting said sliding movement of said carrier and rod providing adjustment of the width of film extruded through said orifice during extrusion.

9. In a flat film die, means for adjusting the extrusion width through the die orifice during extrusion comprising a deckle bar, a deckle bar carrier having opposite side arms slidably engageable with said die with said bar received therebetween, means forming a packing on said bar received in flow stopping relation with the die orifice and being effective to maintain a seal with said orifice as said bar and packing are moved relative to said die body, servo means connected to position said bar and packing thereon with respect to the orifice during extrusion while maintaining said sealing relation with said orifice to define and regulate the width of extrusion therefrom, and a plurality of adjustable screws received in said carrier having ends engageable with said bar and movable there against to effect the seal of said packing at said orifice throughout the effective length of said bar during the movement thereof by said servo means.

10. A power operated adjustable deckle for a flat film die to control remotely the width of the plastic film extruded from a longitudinally extending orifice within the die and adapted to provide a substantial adjustment with relative inexpensive power supply units, comprising a pair of deckle rod means adjustably mounted on one of said rods on each end of the die for longitudinal orifice closing movement therewith for defining the effective length of the orifice within predetermined limits, a separate two-way fluid piston motor at each end of the die and each said motor having an extensible piston rod positioned for longitudinal movement with respect to the die orifice with the total movement of each said piston rod being substantially less than the maximum travel of said corresponding deckle rod over said predetermined limits, releasable coupling means connecting each of said piston rods to the corresponding said deckle rod and being engageable with said rod in a plurality of different positions with respect to the longitudinal length of said rod for effecting movement of said rod in step-by-step increments within said predetermined limits, means for providing fluid under pressure to each said motor, and separately operable valve means for each said motor for controlling the application of fluid under pressure thereto for providing selective extension and retraction of each said deckle rod according to the film width desired.

References Cited by the Examiner

UNITED STATES PATENTS

| 2,471,187 | 6/1949 | Olson. | |
| 2,859,475 | 11/1958 | Tornberg | 18—12 |
| 2,982,995 | 5/1961 | Grolean | 18—12 |
| 3,018,515 | 1/1962 | Sneddon | 18—12 |
| 3,032,819 | 5/1962 | Gasmire | 18—12 X |
| 3,119,150 | 1/1964 | Hungerford | 18—12 |
| 3,132,377 | 5/1964 | Allenbaugh et al. | 18—12 |
| 3,133,313 | 5/1964 | Corbett | 18—12 |
| 3,147,515 | 9/1964 | Amsden | 18—14 |

J. SPENCER OVERHOLSER, *Primary Examiner.*

WILLIAM J. STEPHENSON, *Examiner.*

UNITED STATES PATENT OFFICE
CERTIFICATE OF CORRECTION

Patent No. 3,238,563                          March 8, 1966

Robert E. Hoffman

It is hereby certified that error appears in the above numbered patent requiring correction and that the said Letters Patent should read as corrected below.

Column 1, line 30, after "required" insert -- to --; column 2, lines 52 and 53, for "illustraction" read -- illustration --; line 62, for "died" read -- die --; column 8, line 49, for "2,471,187" read -- 2,474,187 --.

Signed and sealed this 24th day of January 1967.

(SEAL)
Attest:

ERNEST W. SWIDER                        EDWARD J. BRENNER
Attesting Officer                              Commissioner of Patents